Nov. 17, 1931.  W. T. FAVORITE  1,832,373
WINDSHIELD WIPER
Filed Dec. 5, 1928  3 Sheets-Sheet 1
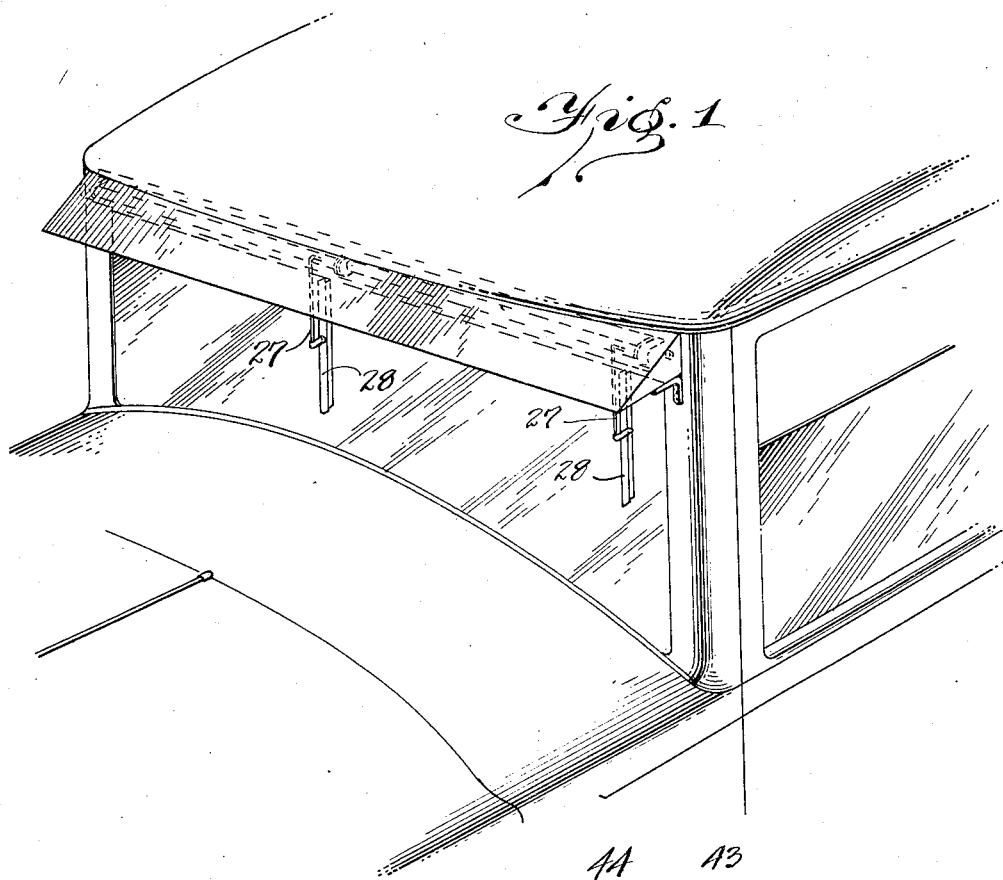
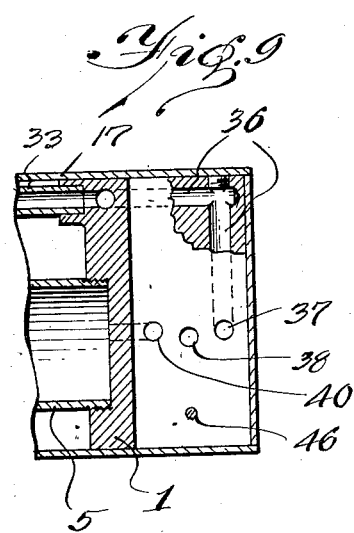
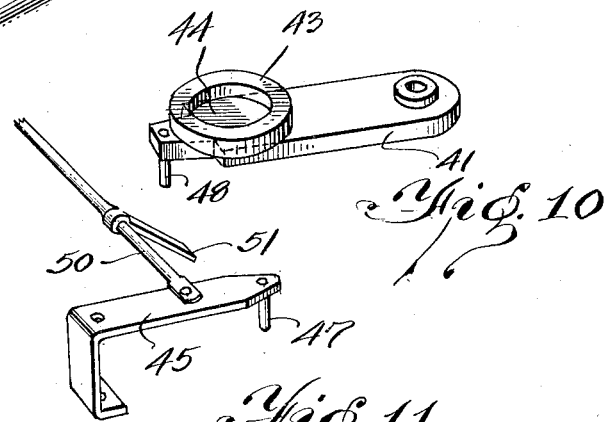
INVENTOR.
William T. Favorite
BY
ATTORNEY.

Nov. 17, 1931. W. T. FAVORITE 1,832,373
WINDSHIELD WIPER
Filed Dec. 5, 1928 3 Sheets-Sheet 2
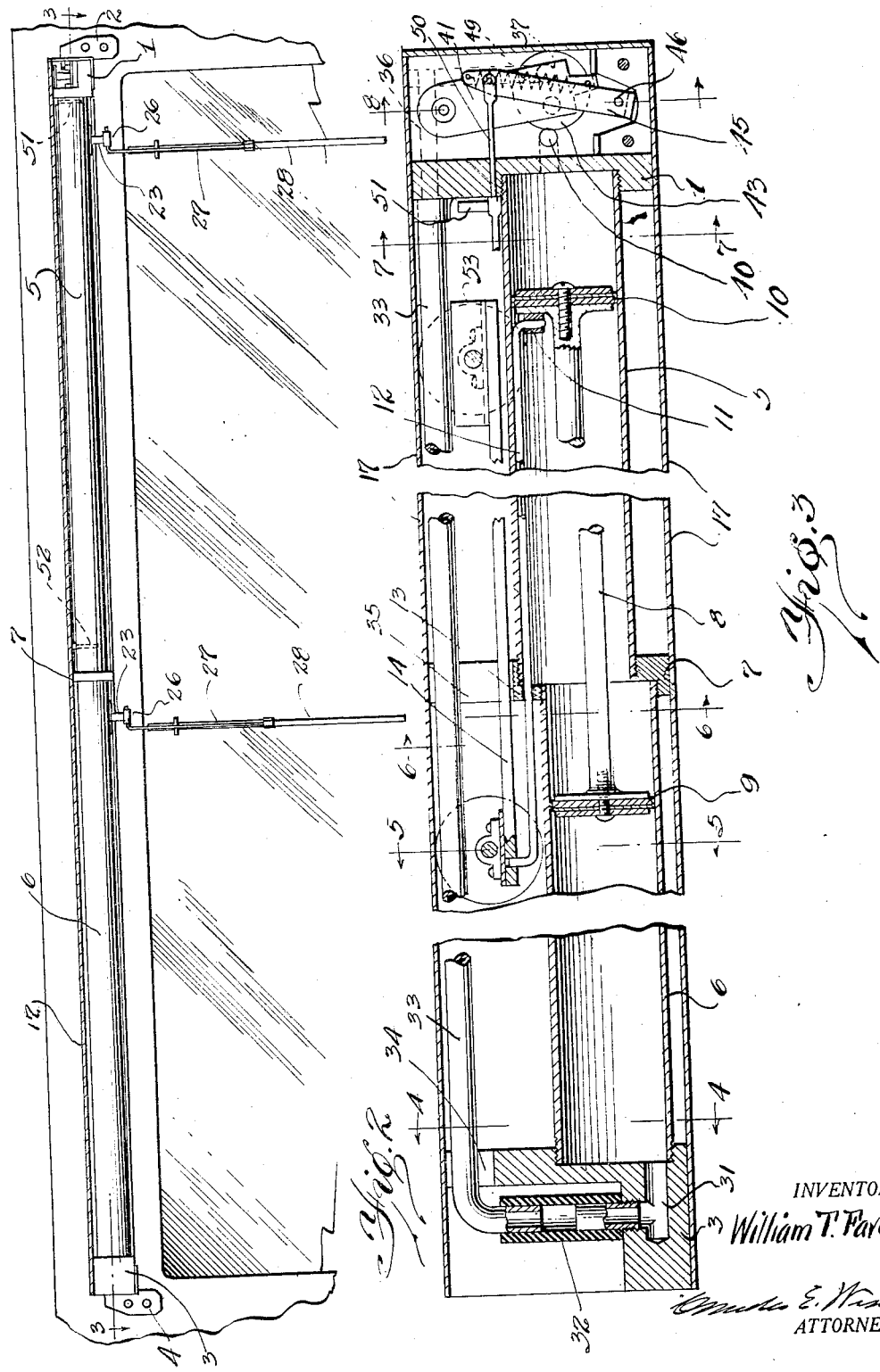
INVENTOR.
William T. Favorite
ATTORNEY.

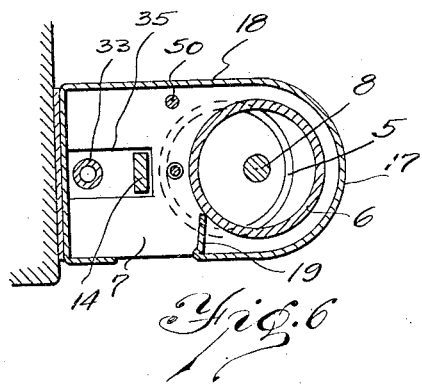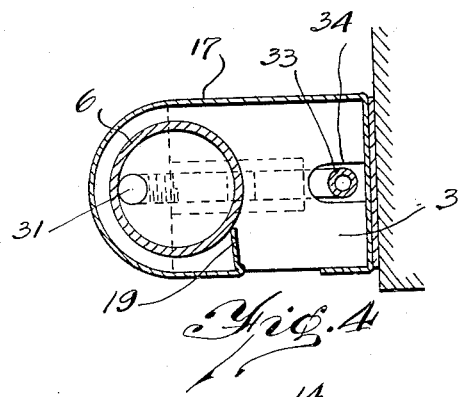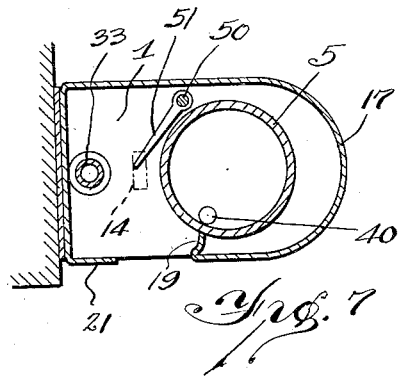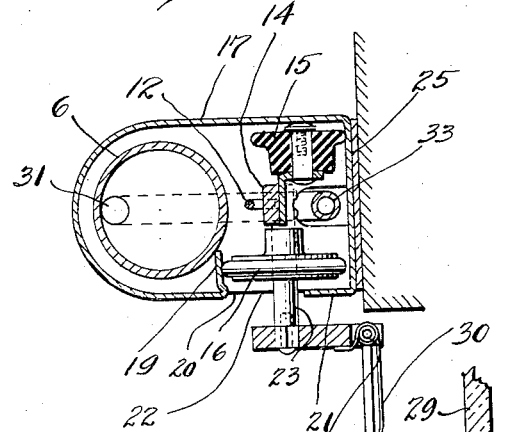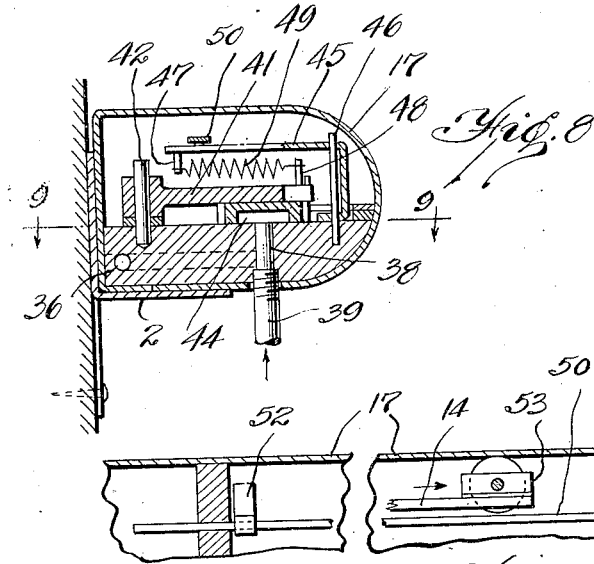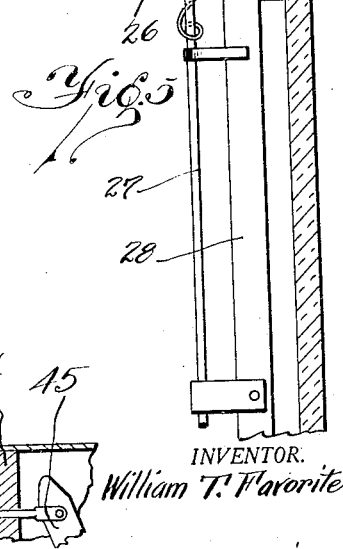

Patented Nov. 17, 1931

1,832,373

UNITED STATES PATENT OFFICE

WILLIAM T. FAVORITE, OF DETROIT, MICHIGAN, ASSIGNOR OF ONE-HALF TO ANDREW W. STAS, OF CHICAGO, ILLINOIS

WINDSHIELD WIPER

Application filed December 5, 1928. Serial No. 323,913.

This invention relates to windshield wipers, and the object of the invention is to provide a windshield wiper adapted to be mounted over the windshield of an automobile and having two squeegees adapted to be moved simultaneously across the windshield to clean the entire width of the windshield.

A further object of the invention is to provide a windshield wiper comprising two tubular cylinders secured together at the center in offset relation, the said offset providing a space through which the operating bar for moving the squeegees is reciprocable.

Another object of the invention is to provide a windshield wiper of the character described comprising a movable carriage carrying the squeegees and a double ended piston reciprocatable in the two tubular cylinders and a connecting rod connecting the double ended piston with the carriage and movable through the offset portion of the tubular cylinders.

A further object of the invention is to provide a valve adapted to be tripped by the carriage at each end of its travel to reverse the direction in which the squeegees are moved.

These objects and the several novel features of the invention are hereinafter more fully described and claimed, and the preferred form of construction by which these objects are attained is shown in the accompanying drawings in which—

Fig. 1 is a perspective view of an automobile body showing my windshield wiper as mounted thereon.

Fig. 2 is a longitudinal section through the windshield wiper casing as mounted above a windshield.

Fig. 3 is an enlarged section taken on line 3—3 of Fig. 2.

Fig. 4 is a section taken on line 4—4 of Fig. 3.

Fig. 5 is a section taken on line 5—5 of Fig. 3.

Fig. 6 is a section taken on line 6—6 of Fig. 3.

Fig. 7 is a section taken on line 7—7 of Fig. 3.

Fig. 8 is a section taken on line 8—8 of Fig. 3.

Fig. 9 is a section taken on line 9—9 of Fig. 8.

Fig. 10 is a perspective view of the under side of the movable valve member.

Fig. 11 is a perspective view showing a detail of the valve actuating device.

Fig. 12 is another detail of the valve actuating device.

The device, as shown in Figs. 2 and 3, comprises a casting 1 at one end to which a bracket 2 is secured and a casting 3 at the opposite end to which a bracket 4 is secured. These brackets 2 and 4 are provided with screw holes for attaching the device to the automobile body above the windshield. A tube or cylinder 5 is threaded into the casting 1 as shown in Fig. 3 and a similar tube 6 is threaded into the casting 3.

As will be noted from Fig. 3 these tubes at the point where they come to abutment are in offset relation in a horizontal plane while as shown in Fig. 2, the tubes are practically continuous in a vertical plane. A casting 7 is provided at the center where these tubes come together and this casting is threaded to receive the tubes as shown. A connecting rod 8 is provided within the tubes 5 and 6 and is provided with a piston 9 on one end riding in the tube 6 and a piston 10 on the opposite end riding in the tube 5. A bracket 11 is provided on the piston 10 and a rod 12 is pivotally mounted in the bracket and extends through an opening 13 in the casting 7 provided in the space in which the tubes 5 and 6 are offset. The opposite end of the rod 12 is connected to the carriage which comprises a bar 14 at each end of which a pair of wheels or rollers 15 and 16 are rotatably mounted as shown in Figs. 3 and 5.

A sheet metal casing 17 is secured to and connects the castings 1, 3 and 7 and this housing 17, as shown in Fig. 5, extends around the tubes 5 and 6 and is provided with an inturned flange 19 having a raised edge 20 which forms a track for the wheel or roller 15. The opposite edge of this housing is formed to provide an inturned flange 21 and the space 22 between the flange 21 and the edge 20 allows the squeegee support 23 to extend therethrough. The flat portion 25 of this housing provides a track on which the wheel or roller 15 may ride. The flange 19, if desired, may be soldered to the tubes 5 and 6 to stiffen the track and strengthen the housing.

The squeegee comprises a member 26 secured to the end of the member 23 and an arm 27 is pivotally mounted on the member 26 and at the lower end is pivoted to a squeegee 28 which rides against the windshield 29. A spring 30 is provided engaging the member 26 and arm 27 and tends to hold the squeegee in contact with the windshield. This spring tension has a reverse action in holding the roller 16 in contact with the track 19 and this twisting action of the spring on the carriage also holds the roller 15 in contact with the track 25. As rollers 15 and 16 are provided at each end of the bar 14 and the construction shown in Fig. 5 is duplicated at each end of this bar the complete carriage is thus rotatably mounted on the wheels within the casing 17.

As shown in Fig. 3 a conduit 31 opens from the end of the tube 6 and this conduit is connected by means of a flexible conduit 32 with a conduit 33. The conduit 33, as shown in Figs. 3 and 4, extends through a notch 34 in the casting 3 and, as shown in Fig. 6, extends through a notch in the casting 7 and at the end the conduit 33 is in communication with a conduit 36 in the casting 1 which terminates in an opening 37 in the said casting as shown in Fig. 9. An opening 38 is also provided in the said casting which, as shown in Fig. 8, is connected by means of a conduit 39 with the intake manifold of the automobile engine to provide suction. As shown in Figs. 3 and 9 an opening 40 is also provided in the casting 1 which is in direct communication with the tube or cylinder 5.

As shown in Figs. 3, 8 and 10 an arm 41 is pivotally mounted at 42 on the casting 1, and this arm carries a plate 43 having a recess 44 therein. This recess is of sufficient diameter to cover the openings 37 and 38 as will be understood from Fig. 3 or the arm 41 may be turned on its pivot so that the recess 44 covers the openings 38 and 40. When in the position shown in Fig. 3 the recess 44 covers the openings 37 and 38 and the suction produced in the tube 39 is communicated through the conduit 33 to the interior of the cylinder 6 to draw the piston 9 to the left of Fig. 3. When the recess 44 covers the openings 38 and 40 the suction is communicated directly to the cylinder 5 to move the piston 10 to the right of Fig. 3.

The mechanism for throwing the arm 41 from one position to the other comprises an arm 45 shown in Fig. 11 which, as shown in Fig. 8, is pivotally mounted on a pin 46 in the casting 1. This arm 45 is provided with a pin 47 in the end thereof and the arm 41 is provided with a pin 48 in the end thereof. The pins 47 and 48 are connected by a coiled spring 49 so that when the end of the arm 45 is moved past the center of the arm 41 as will be understood from Fig. 3, the spring 49 immediately throws the arm 41 one way or the other to cover the openings 37 and 38 or 38 and 40. To produce this movement of the arm 45 a rod 50 is pivotally connected to the said arm and is slidably mounted in the casting 1 as shown in Figs. 3 and 7 and in the casting 7 as shown in Fig. 6.

The rod 50, as shown in Figs. 3, 11 and 12, is provided with two depending fingers 51 and 52, and as will be noted from Fig. 3, the carriage is provided with a bracket 53 adapted, upon movement of the carriage to the right of Fig. 3, to engage the finger 51 and move the rod 50 to the right of Fig. 3, thus moving the actuating mechanism to the position shown in Fig. 3. Upon movement of the carriage in the opposite direction the opposite end of the bracket 53 engages the finger 52 thus moving the rod 50 to the left of Fig. 3. This movement of the rod 50 moves the arm 45 to the left of Fig. 3 on its pivot 46 and as this arm 45 passes the center line of the arm 41 the spring 49 throws the arm 41 on its pivot to the left of Fig. 5 so that the recess 44 in the end of the arm covers the openings 38 and 40 in the casting 1. At this time the tube 5 is connected directly with the opening 38 by means of the short conduit 40 and the suction through the conduit 39, as shown in Fig. 8, draws the piston 10 and its companion parts to the right of Fig. 3. This moves the squeegees, shown in Fig. 2, to the right of Fig. 2 until the bracket 53 on the carriage strikes the finger 51 to throw the arm 41 to the position shown in full lines in Fig. 3. At this time the suction is carried through the recess 44 through the conduits 36, 33, 32 and 31 to the tube 6 thus drawing the piston 9 and parts connected thereto to the left of Fig. 3 and moving the squeegees to the left of Fig. 2 across the face of the windshield.

At the left of this movement the bracket 53 on the carriage engages the finger 52 thus moving the rod 50 to the left of Fig. 3 and moving the actuating mechanism so that the recess 44 covers the ports 38 and 40 at which time the suction is again applied to the tube 5 to draw the moving parts of the mechanism to the right of Fig. 3 thus returning the squeegees across the face of the windshield.

It will be noted that the rod 12 extends through the casting 7 at a point between the pistons 9 and 10 and as no suction is applied to the tubes 5 and 6 between the pistons there is no leakage through the opening 13 though air can pass in and out through this opening to a slight extent as required by the movement of the pistons. The tube 39 which leads to the intake manifold of the engine is preferably provided with a valve (not here shown) by which the device may be shut off or turned on as will be readily understood. It will be particularly noted from Fig. 3 that the moving parts of the device comprise the two pistons 9 and 10, the connecting rod 8, the rod 12 which connects the pistons with the carriage 14 and the rollers and squeegees carried by the carriage. These parts all move as a unit and move the squeegees therewith. The only other moving part is the rod 50, actuated by the carriage at each end of its movement, which acts as a slide valve in controlling the direction of movement of the other movable parts.

From the foregoing description it becomes evident that the device is very simple and efficient in operation, will not easily get out of order, is composed of few parts and is of consequent low manufacturing cost and provides a device which accomplishes the objects described.

Having thus fully described my invention, its utility and mode of operation, what I claim and desire to secure by Letters Patent of the United States is—

1. In a windshield wiper, a pair of tubes, a casting connecting the tubes together at the abutting ends in offset relation, a casting at the opposite end of each tube, a housing in which the castings and tubes are mounted, a conduit open to each tube and terminating in one of the castings, a third conduit terminating between the terminals of the other two conduits, a valve adapted in one position to connect one conduit with the third conduit and adapted in the other position to connect the other conduit with the third conduit, a double ended piston mounted in the said tubes and reciprocatable therein, a rod connected to the double ended piston, the casting at the abutting ends of the tubes being provided with an aperture at the point where one tube is offset from the other, said rod extending through the said aperture, a roller mounted carriage movable longitudinally of the housing, and a valve actuating mechanism for moving said valve actuated by the carriage at each end of its movement.

2. In a windshield wiper, a pair of tubes secured together at the abutting ends in offset relation, a piston reciprocable in each tube, a rod connecting the pistons, a second rod movable with the pistons and extending through the offset portion of one of the tubes, a carriage movable longitudinally of the tubes by the said rod, a conduit open to each tube, a casting in which the conduits terminate in adjacent relation, a third conduit terminating adjacent the other two conduits, a valve adapted to connect the third conduit with one or the other of the remaining conduits, and means actuated by the carriage at each end of its movement for moving the said valve to connect the first two conduits alternately with the third conduit.

3. In a windshield wiper, a pair of aligned tubes secured together with the inner ends in abutment, the end of one tube being offset slightly in relation to the other, a piston in each tube, a rod connecting the pistons, a second rod movable with the pistons and extending through the offset portion of one of the tubes, a carriage movable longitudinally of the tubes by the said rod, a conduit through which air may be withdrawn from the tubes, and means actuated by the carriage at each end of its movement for connecting the conduit with the tubes alternately.

4. In a windshield wiper, a pair of tubes, a casting connecting the tubes together at the abutting ends in offset relation, a casting at the opposite end of each tube, a housing supporting the castings and tubes therein in fixed relation, a carriage movable longitudinally of the housing, a series of wheels on which the carriage is movably mounted, the housing being formed to provide tracks on which the wheels may ride, a pair of connected pistons in the said tubes, means connecting the pistons with the carriage including a bar extending through the offset portion of one of the tubes, and means for causing a reciprocation of the pistons and carriage as a unit for operating the wiper.

5. In a windshield wiper, a pair of tubes secured together with the ends in abutment, the abutting end of one tube being offset in relation to the other, a piston in each tube, a rod connecting the pistons, a second rod movable with the pistons and extending through the offset portion of one of the tubes, a carriage movable longitudinally of the tube by the said rod to cause operation of the wiper, a housing in fixed relation with the tubes, a track formed in the housing and a series of rollers on the carriage riding on the said track.

6. In a windshield wiper, a pair of cylinders secured together at the abutting ends in partially offset relation, a piston in each cylinder, a rod connecting the pistons, a second rod extending through the offset portion of one cylinder and movable with the pistons and a carriage connected with said second rod and thereby movable with the pistons to effect operation of the wiper.

7. The combination of two cylinders of substantially equal size and disposed end to end with their adjacent ends open to atmosphere and with the line of the inner wall surface of one cylinder offset with respect to the line of the outer wall surface of the other cylinder, a power transmitting member movable parallel to said inner and outer wall surfaces and between the lines thereof, pistons in said cylinders connected within the cylinders for movement in unison, and means within one of said cylinders connecting said power transmitting member with said pistons.

In testimony whereof I sign this specification.

WILLIAM T. FAVORITE.